Sept. 9, 1924.

A. W. BUCK

X-RAY CASSETTE

Filed May 31, 1922

Inventor
Arthur W. Buck
By Watson E. Coleman
Attorney

Sept. 9, 1924.
A. W. BUCK
X-RAY CASSETTE
Filed May 31, 1922
1,507,727
2 Sheets-Sheet 2
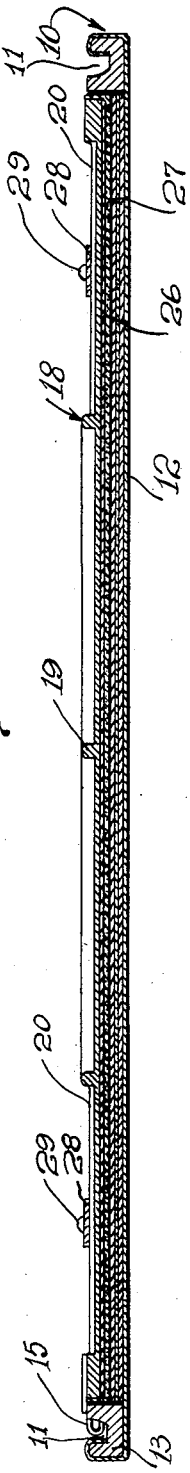
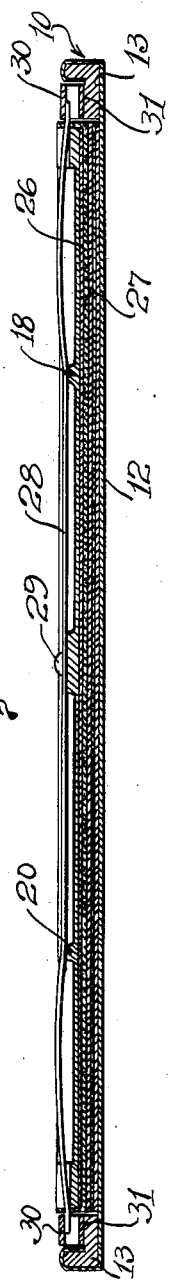
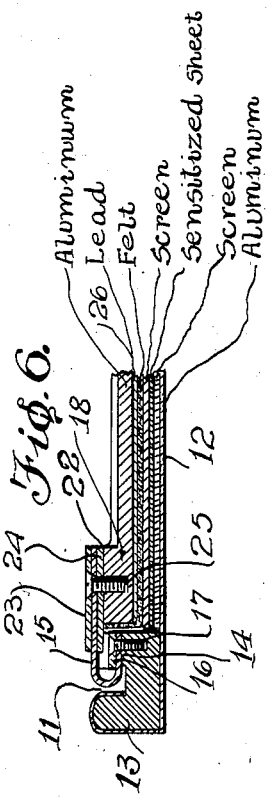
Inventor
Arthur W. Buck
By Watson E. Coleman
Attorney Patented Sept. 9, 1924.

1,507,727

UNITED STATES PATENT OFFICE.

ARTHUR WELLS BUCK, OF ST. LOUIS, MISSOURI.

X-RAY CASSETTE.

Application filed May 31, 1922. Serial No. 564,728.

*To all whom it may concern:*

Be it known that I, ARTHUR W. BUCK, a citizen of the United States, residing at St. Louis, and State of Missouri, have invented certain new and useful Improvements in X-Ray Cassettes, of which the following is a specification, reference being had to the accompanying drawings.

This invention relates to the art of X-ray photography, and particularly to cassettes, that is the holders which are used for holding a fluorescent intensifying screen and a sensitive plate in contact.

The fluorescent side of the intensifying screen in a cassette is brought directly against the sensitive side of the X-ray plate, and when the X-ray is directed upon this combination the intensifying screen fluoresces in proportion to the amount of X-rays received and the X-ray plate gets its exposure from the fluorescence of the screen. This makes it possible to X-ray a heavy body with an exposure one-tenth as great as would be necessary had the screen been omitted and the exposure made directly onto the plate.

One of the main necessities in a cassette is that it should be so constructed as to hold the fluorescent side of the screen in perfect contact with the sensitive side of the plate or film. If the two surfaces are not in perfect contact the image will show a blurred or diffused appearance lacking detail, and to overcome this the inside covers of all cassettes have a layer of felt about one-sixteenth of an inch in thickness. Even this, however, does not secure a close contact over the entire area between the fluorescent screen and the plate or film for the reason that heretofore the aluminum sheet forming one side of the cassette has not been so attached or otherwise engaged with the frame of the cassette as to prevent the sheet of aluminum from bulging away from the center, leaving a center field where the contact was poor.

Another difficulty with the ordinary cassette is that they have not been rigid enough to support patients who are being X-rayed, the patient lying upon the cassette, necessitating, therefore, that the cassette shall have a strength sufficient to carry a patient, say having a weight of 200 pounds, without the cassette bending under the weight, which bending would result in breaking the glass plate if such be used.

Another objectionable feature in the construction of the ordinary cassette is due to the fact that the springs used to engage the cover of the cassette with the body of the cassette do not force the cover against the sensitive plate or film and the screen or screens evenly and do not bear at a plurality of points upon the cover. As a consequence, there is liability of diffusion wherever there is a slight space between the sensitive plate and the fluorescent screen.

With these and other disadvantageous features of the ordinary cassette in mind, one object of the present invention is to so connect the sheet aluminum forming the front of the cassette with the frame thereof that this sheet aluminum shall be drawn perfectly flat and held taut and clinched over the frame so that there can be no possible bulging in the center of the aluminum sheet.

A further object is to so apply the springs to the back or cover of the cassette that spring pressure is applied to four points of the cover, thereby securing even and close contact of the sensitive sheet and screen over the entire surface of the front.

A still further object is to so construct the back or cover that it is reinforced with intersecting ribs which carry the weight of the patient, add strength to the cover, and prevent this cover from bending.

Another object is to provide for a hinged attachment of the cover to the frame of the cassette and so constructed as to prevent the screens from grinding together when opening and closing the cassette.

Still another object is to so construct the axle as to make it light in weight, secure a maximum of strength, and secure pressure where pressure is needed.

Other more detailed objects will appear in the course of the following description.

My invention is illustrated in the accompanying drawings, wherein:—

Figure 4 is a section on the line 4—4 of Figure 1 but with the cassette closed;

Figure 5 is a section on the line 5—5 of Figure 1 with the cassette closed;

Figure 6 is a fragmentary section on the line 6—6 of Figure 1, but with the cassette closed.

Figure 1:
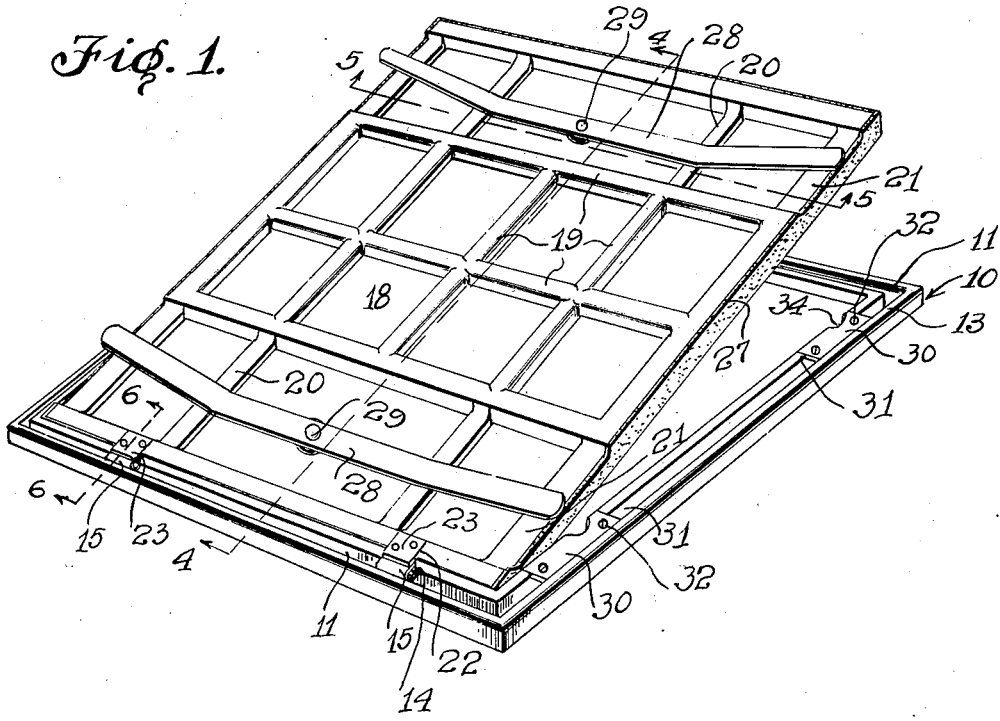
Figure 1 is a perspective view of a cassette constructed in accordance with my invention, showing the cover partly open.
Figure 2:
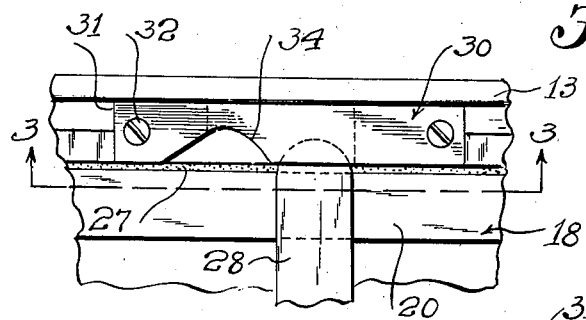
Figure 2 is a fragmentary top plan view of a portion of the frame and cover showing a spring and its keeper.
Figure 3:
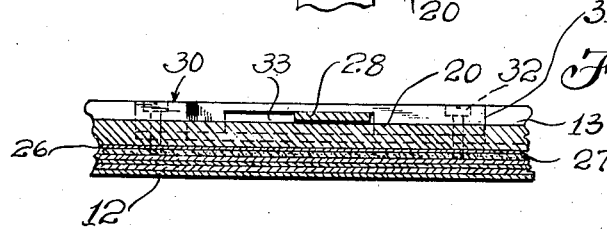
Figure 3 is a section on the line 3—3 of Figure 2.

Referring to the drawings, 10 designates the rectangular frame of the cassette, which is made of steel or any other suitable metal, this frame having a groove 11 which extends entirely around the frame between the inner and outer edges. The front of the cassette is formed of a sheet of aluminum, designated 12, which is drawn over the flange 13 of the frame and over the edge of this flange and down upon the inside of the flange. This drawing of the aluminum sheet over the frame is done with powerful dies which stretch the sheet of aluminum and clinch the edges into the groove 11 where they are permanently held. This manner of connecting the sheet of aluminum 12 to the frame 10 gives a sheet aluminum front which will not bulge away but which is disposed in one absolutely perfect plane.

Heretofore it has been customary to lay a sheet of aluminum over the frame of the cassette and then rivet or otherwise fasten the edges of the aluminum. Under these conditions when the lid or cover of the cassette is closed down on the screen, the sheet aluminum front would bulge away in the center, leaving a center field where the contact was poor. If the patient was lying directly on the cassette, the weight would, of course, hold the plate or screen and film in contact, but very often cassettes are used in plate tunnels or in "Potter-Bucky" diaphragms where the patient does not lie on the cassette. Under these circumstances, the lack of pressure would permit the screen and film to bulge away in the center, producing a diffused image. This is entirely done away with by connecting the aluminum sheet 12 to the frame 10 in the manner described.

The frame at one end is recessed, as at 14, this recess intersecting the groove 11, and disposed in the recesses 14 are the ends of the leather hinges 15, these hinges being held to the frame by a plate 16 having screws 17 passing therethrough. The cover 18 is of cast metal, as for instance aluminum, and is of an area such that it will fit down snugly within the frame. The cover is so cast as to provide a series of intersecting ribs 19. The longitudinal ribs at the points 20 are less in height than the ribs over the remainder of the cover and the marginal ribs of the frame are also reduced in height at 21. A marginal rib at one end of the cover is recessed, as at 22. The leather hinge 15 is disposed in this recess and on each side of this leather hinge 15 there are disposed the metal plates 23 and 24, as illustrated in detail in Figure 6. Screws 25 pass through these metal plates and the end of the leather strip into the cover plate.

The inner face of the aluminum cover carries a sheet of lead 26 and over this sheet of lead is disposed a felt pad 27, this felt pad extending around the side edges of the cover and when the cover is closed fitting against the inner face of the wall constituted by the inner edge of the frame 10 so that a light-tight contact is secured between the cover and the frame. For the purpose of holding the cover closed within the frame and in tight contact with the sensitive plate and with the screen or screens, I provide the two springs 28 pivoted at 29, these springs being approximately semi-elliptical or having their outer ends bowed away from the plane of the cover. These springs extend over the relatively low rib portions 20 and the extremities of the ribs are adapted to engage in keepers 30 disposed in recesses 31 formed in the inner flange or margin of the frame and held in place by screws 32. These keepers are recessed at 33 to receive the ends of the springs and the outer wall of each keeper is cut away, as at 34, to permit the entrance of the springs into the keepers. Thus when the ends of the springs are forced downward they will pass through the openings 34 and then the spring is shifted so as to carry the extremities of the spring beneath the keepers. Under these circumstances each spring will bear at two points against the rib portions 20 so that the intermediate portion of the cover is forced firmly against the sensitive sheet or plate and the front. In other words, by my construction the springs engage the cover or lid at a plurality of points, forcing it inward, securing a much more uniform pressure than is possible where the springs do not engage the relatively shallow ribs 20.

The hinges which have been heretofore described are of importance for the reason that it is necessary to so construct these hinges that the cover may rise and fall according to the thickness of the screens, film plates, etc., used in the cassette. It is necessary, therefore, to have a flexible hinge. These hinges may be of leather, woven webbing, or some similar flexible material. These flexible hinges have been used for many years but they were always open to one objection. When one screen only is used, it is attached to the cover of the cassette, but when two fluorescent screens are used, the second screen is attached to the bottom of the cassette and the sensitive or fluorescent sides of the screens face each other, and in opening and closing, the cassette having a flexible hinge, the two screens would be liable to grind together on the hinged end of the cover, thereby scratching and otherwise damaging the screens. This difficulty is overcome by using the metal plates 23 and 24 on each side of the leather hinge, the plates being attached to the cover and projecting over onto the frame of the cassette. Therefore, when the cover is opened these plates prevent the end of the cover from riding down into the frame and scratching the screens or causing the screens to scratch each other. In other words, these hinges are constructed to secure the same effect as a rigid hinge but at the same time permit the cover to accommodate one or two screens and either plates or films.

A cassette constructed in accordance with this invention has been found thoroughly effective and satisfactory in actual use. The reinforcing ribs so strengthen the cover that the cover will support the weight of a very heavy patient without bending and thereby tending to break the glass plate or deflect the plate or film and, as before explained, the manner of attaching the sheet of aluminum to the frame is such that the sheet is always stretched taut and thus the film or plate and the fluorescent screen or screens are brought in intimate contact throughout the entire area of the plate or film. The frame and the cover of the cassette are preferably made of cast aluminum, and the cassette has a total thickness of about ½″. Such a cassette as this is light in weight but particularly rigid.

While I have illustrated a detailed construction which I believe to be preferable, I do not wish to be limited to all the details illustrated, as it is obvious that many of these details might be varied in many minor ways without departing from the spirit of the invention.

I claim:

1. An X-ray cassette including a rectangular frame, the frame being formed with a shoulder upon one surface, and a sheet of aluminum constituting the front of the cassette having its margins bent over the edge of the frame and bent over and drawn over said shoulder, whereby the sheet of aluminum is rendered taut throughout its entire surface.

2. An X-ray cassette including a rectangular frame having a shoulder upon one face thereof extending entirely around the frame, and a sheet of aluminum forming the front of the cassette, the margins of the sheet being bent to extend over the edges of the frame and then clinched over said shoulder.

3. An X-ray cassette including a frame, a sheet of aluminum forming the front of the cassette and attached to the frame at its margins, a cover fitting within the frame, means for hingedly connecting the cover to the frame comprising flexible strips attached to the outer face of the cover and to the frame, and metal plates disposed on each side of the strips and projecting outward from the cover over said frame, the frame and cover being recessed to accommodate the flexible strips and the plates.

4. An X-ray cassette including a rectangular frame formed upon one face with a channel, a sheet of aluminum attached to said frame and forming the front of the cassette, a cover, means for hingedly connecting the cover to the frame, each hinge consisting of a strip of flexible material attached to the frame within the channel thereof, the opposite end of the strip being attached to the margin of the frame, and metal plates disposed on each side of the strip and attached to the cover, said plates projecting outward from the cover a distance equal to the thickness of the inner wall of said channel.

5. An X-ray cassette having a rigid frame, the frame being formed around its entire margin and upon the rear face of the frame with an outwardly projecting rib, and a sheet of aluminum forming the front of the cassette having its margins extended over said frame and then extending at right angles around the edges of the frame and over said rib and embracing the same.

6. An X-ray cassette having a rigid rectangular frame, the rear face of the frame being formed at its margin with an outwardly projecting rib extending around all four sides of the frame, and a sheet of aluminum forming the front of the cassette and having its margins extended along the four side edges of the frame and clinched over three sides of the rib, the sheet being thus taut throughout its entire surface.

In testimony whereof I hereunto affix my signature.

ARTHUR WELLS BUCK.